(12) United States Patent
Pogue

(10) Patent No.: US 7,371,792 B2
(45) Date of Patent: May 13, 2008

(54) STAIN COMPOSITIONS AND RELATED COATED SUBSTRATES

(75) Inventor: Robert T. Pogue, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 70 days.

(21) Appl. No.: 11/312,182

(22) Filed: Dec. 20, 2005

(65) Prior Publication Data

US 2007/0142520 A1     Jun. 21, 2007

(51) Int. Cl.
*C08L 67/08* (2006.01)
*C09D 15/00* (2006.01)
*C09D 167/08* (2006.01)

(52) U.S. Cl. .................................. 524/313
(58) Field of Classification Search .......... 524/313
See application file for complete search history.

(56) References Cited

U.S. PATENT DOCUMENTS

| | | | |
|---|---|---|---|
| 2,565,602 A | 8/1951 | Fisher, Jr. et al | 117/57 |
| 3,776,752 A | 12/1973 | Craven | 117/10 |
| RE30,891 E | 3/1982 | Baratto | 428/142 |
| 4,385,149 A * | 5/1983 | Tsuchiya et al. | 524/313 |
| 4,479,825 A | 10/1984 | Fernandez | 106/34 |
| 4,536,218 A * | 8/1985 | Ganho | 524/270 |
| 5,116,408 A | 5/1992 | Crozer | 106/19 |
| 5,326,394 A * | 7/1994 | Cobb | 106/504 |
| 5,338,351 A * | 8/1994 | Pennaz | 524/599 |
| 5,395,436 A | 3/1995 | Setzke | 106/34 |
| 5,762,696 A * | 6/1998 | Jordan | 106/226 |
| 5,959,067 A | 9/1999 | Bakker et al. | 528/295.3 |
| 6,686,399 B1 | 2/2004 | Kawamura et al. | 521/48 |
| 6,794,055 B2 * | 9/2004 | Dean et al. | 428/537.1 |
| 6,946,509 B2 | 9/2005 | He | 524/413 |
| 2002/0132885 A1 | 9/2002 | Burns et al | 524/35 |
| 2004/0151931 A1* | 8/2004 | Dean et al. | 428/507 |

FOREIGN PATENT DOCUMENTS

| | | |
|---|---|---|
| EP | 1 156 087 A1 | 11/2001 |
| GB | 2408511 | 6/2005 |
| JP | 53107401 | 9/1978 |
| JP | 59031386 | 8/1984 |
| JP | 20044249712 | 9/2004 |
| WO | WO 01/00741 A1 | 1/2001 |

OTHER PUBLICATIONS

McWhorter Technologies, Liquid Coatings Polymer Reference Guide, 30 pages, High Solids Resins Alkyds.

* cited by examiner

*Primary Examiner*—David M. Brunsman
(74) *Attorney, Agent, or Firm*—Donald R. Palladino

(57) ABSTRACT

Disclosed are dryable stain compositions, such as wiping stains, that include a binder including a mixture of an alkyd resin and a drying and/or semi-drying oil, wherein the stain composition (a) includes no more than 100 grams of volatile organic material per liter of the stain composition, and (b) is substantially free of water. Also disclosed are porous substrates at least partially coated with such stain compositions, methods for staining at least a portion of a porous substrate with such stain compositions, and porous substrates at least partially coated with a multi-layer composite coating system wherein at least one coating layer is deposited from such a stain composition.

19 Claims, No Drawings

STAIN COMPOSITIONS AND RELATED COATED SUBSTRATES

FIELD OF THE INVENTION

The present invention relates to stain compositions, such as wiping stains, suitable for application to porous substrates, porous substrates comprising a surface at least partially coated with such a stain composition, and multi-component composite coatings comprising a coating layer deposited from such a stain composition.

BACKGROUND OF THE INVENTION

Stains are often applied to porous substrates, such as wood, to, for example, provide coloring while allowing some of the substrate's natural color and grain to show through. Historically, there have been two basic types of wood stains: water-based and oil-based.

Water-based stains have been favored from an environmental standpoint, since such compositions contain little or no volatile organic materials that are released into the atmosphere. Such stains, however, have drawbacks. Water-based stains are notorious for causing wood grain-raising. In other words, the water in the stain composition lifts the wood fibers, thereby roughening the wood surface, which often necessitates an additional sanding operation to generate a smooth surface. Also, because they are fast-drying, water-based stains can be difficult to employ as a wiping stain while still obtaining color consistency.

Oil-based stains have also been used and are capable of performing adequately in many cases. They are typically non-grain raising and not quick to dry, i.e., they have a long open time. Such stains, however, have historically required the use of significant amounts of volatile organic material, 250 or more grams of volatile organic material per liter of the stain composition, in order to reduce the viscosity of the composition and/or render the stain dryable. The use of significant amounts of volatile organic materials though, as indicated above, is disfavored from an environmental standpoint.

As a result, it would be desirable to provide stain compositions, such as wiping stains, that are dryable, non grain-raising, have long open time, and which contain little or no volatile organic materials.

SUMMARY OF THE INVENTION

In certain respects, the present invention is directed to dryable stain compositions comprising a binder comprising a mixture of an alkyd resin and a drying and/or semi-drying oil, wherein the stain composition: (a) comprises less than 100 grams of volatile organic material per liter of the stain composition; and (b) is substantially free of water.

In other respects, the present invention is directed to dryable wiping stain compositions comprising a binder comprising a mixture of an alkyd resin and a drying and/or semi-drying oil, wherein the stain composition: (a) comprises less than 250 grams of volatile organic material per liter of the stain composition; and (b) is substantially free of water.

The present invention is also directed to porous substrates at least partially coated with such a stain composition, methods for staining at least a portion of a porous substrate with such a stain composition, and porous substrates at least partially coated with a multi-layer composite coating system wherein at least one coating layer is deposited from such a stain composition.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. For example, and without limitation, this application refers to stain compositions that comprise an "oil". Such references to "an oil" is meant to encompass compositions comprising one oil as well as compositions that comprise more than one oil, such as compositions that comprise two or more oils. In addition, in this application, the use of "or" means "and/or" unless specifically stated otherwise, even though "and/or" may be explicitly used in certain instances.

In certain embodiments, the present invention is directed to stain compositions suitable, for example, for application over a porous substrate, such as wood. As used herein, the term "porous substrate" refers to substrates that contain pores or interstices via which a liquid composition may penetrate the substrate surface. As used herein, the term "stain" refers to a translucent composition that, upon application to a porous substrate, covers the substrate surface but, rather than flowing and leveling upon the surface, penetrates the pores or interstices of the substrate. Stains may also color the substrate, while allowing some of the substrate's natural color and grain to show through. "Stains," for purposes of the present application, are to be distinguished from other coatings, such as paints, that, upon application to a porous substrate, flow and level upon the substrate surface to form a continuous coating film, without significantly penetrating the substrate surface.

In certain embodiments, the stain compositions of the present invention comprise a wiping stain composition. As used herein, the term "wiping stain" refers to compositions that are suitable for application to a porous substrate wherein, after being allowed to penetrate the substrate surface, excess material is safely removed by wiping with a cloth or other device. "Wiping stains" should be distinguished, for purposes of the present invention, from "non-wiping" or "penetrating" stains wherein the composition, when applied to a porous substrate, penetrates the substrate surface to such an extent that there is no significant amount of excess material remaining on the surface to be removed. As should be apparent, it is desirable that wiping stains be substantially free or, in many cases, completely free of toxic substances, such as (meth)acrylates. As a result, certain embodiments of the present invention are substantially free or, in some cases, completely free of such materials. As used herein, the term "(meth)acrylate" is meant to include both acrylates and methacrylates. As used herein, the term "substantially free" means that the material being discussed is present in the composition, if at all, as an incidental impurity. In other words, the material does not affect the properties of the composition. As used herein, the term "completely free" means that the material being discussed is not present in the composition at all.

The stain compositions of the present invention comprise a binder. As used herein, the term "binder" refers to the material(s) in a composition that are film-forming. As used herein, "film-forming" means that a material forms a film upon drying and/or curing at ambient or elevated temperature.

In certain embodiments, the stain compositions of the present invention comprise a binder that comprises an alkyd resin. As used herein, the term "alkyd resin" refers to a polyester resin that is the reaction product of a polybasic acid or anhydride and a polyhydric alcohol chemically combined with the acid of an oil fatty acid. The oil fatty acid is coupled into the resin molecule by esterification during manufacture and become an integral part of the polymer. As used herein, the term "oil fatty acid" includes drying oils, semi-drying oils, and non-drying oils, including mixtures thereof. In certain embodiments, the alkyd resin that is present in the stain compositions of the present invention is capable of undergoing oxidative cure. As will be appreciated by those skilled in the art, when one or more drying oils, one or more semi-drying oils or mixtures of drying and semi-drying oils are used, the alkyd resin will be capable of undergoing oxidative cure. Similarly, when a mixture of at least one drying oil and/or the semi-drying oil with a non-drying oil is used, with the mixture being predominantly drying and/or semi-drying, the alkyd resin will also be capable of undergoing oxidative cure. "Predominantly drying" and/or "semi-drying" means that at least about 45 percent of the oils used in the manufacture of the alkyd resin are drying and/or semi-drying. Both drying and semi-drying oils contain carbon-carbon double bonds that are capable of undergoing oxidative crosslinking, whereas nondrying oils either don't contain such bonds or don't contain a sufficient number of such bonds to effect cure.

Non-limiting examples of drying and semi-drying oils suitable for use in preparing the alkyd resin included in the compositions of the present invention are castor oil, dehydrated castor oil, cottonseed oil, fish oil, linseed oil, menhaden oil, oiticica oil, palm kernel oil, perilla oil, safflower oil, sardine oil, soybean oil, sunflower oil, tall oil, tung oil, walnut oil, hydrocarbon/mineral oils, such as paraffin oil, white oil, and process oils, essential oils, such as lavender oil, rose oil and pine oil, silicone oil, and mixtures thereof. Examples of suitable non-drying oils include, without limitation, valeric acid, heptanoic acid, 2-ethyl hexanoic acid, pelargonic acid, isononanoic acid, lauric acid, coconut oil fatty acid, stearic acid and branched fatty acids containing 18 carbon atoms. Predominantly drying/semi-drying oils are often more appropriate for use in preparing the alkyd resin present in the stain compositions of the present invention.

Suitable polyhydric alcohols that can be used in forming an alkyd resin present in the stain compositions of the present invention include, without limitation, glycerol, neopentyl glycol, cyclohexanedimethanol, ethylene glycol, propylene glycol, pentaerythritol, neononyl glycol, diethylene glycol, dipropylene glycol, trimethylene glycol, trimethylolpropane, dipentaerythritol, tripentaerythritol, and mixtures thereof.

Suitable polybasic acids/anhydrides that can be used in forming such alkyd resins include, without limitation, polycarboxylic acids and anhydrides thereof. Non-limiting examples of suitable polycarboxylic acids include phthalic acid, isophthalic acid, terephthalic acid, tetrahydrophthalic acid, hexahydrophthalic acid, adipic acid, azelaic acid, glutaric acid, 3,3-diethylglutaric acid, malonic acid, pimelic acid, sebacic acid, suberic acid, succinic acid, 2,2-dimethylsuccinic acid, 2-methylsuccinic acid, dodecenylsuccinic acid, itaconic acid, fumaric acid, maleic acid, citraconic acid, diethyl maleic acid, trimellitic acid, and mixtures thereof; the anhydrides of those polybasic acids are also suitable. Polybasic acids having greater than three acid moieties or the higher polyfunctional alcohols should not be utilized in amounts that will cause the alkyd resin to gel during preparation.

In certain embodiments, the alkyd resin present in the stain compositions of the present invention is a pourable resin at one hundred percent solids. As used herein, "pourable" means that the viscosity of a material is such that the material is capable of flowing down the container in which it is stored, when the container is tipped over. Such alkyd resins are commercially available. A suitable, but non-limiting, example is Duramac™ HS 55-5543, commercially available from Resolution Specialty Materials.

In certain embodiments, the alkyd resin is present in the stain compositions of the present invention in an amount of 10 tip to 60 percent by weight or, in some embodiments, 20 up to 50 percent by weight, or, in yet other embodiments, 30 up to 40 percent by weight, with weight percent being based on the total weight of the composition.

In certain embodiments, the stain compositions of the present invention comprise a binder that comprises a mixture of the previously described alkyd resin with a drying and/or semi-drying oil. In these embodiments, the drying and/or semi-drying oil is a separate component of the composition and is in addition to the oil that is used to prepare the alkyd resin, as previously described. Any of the drying and semi-drying oils previously described as being suitable for use in preparing the alkyd resin are also suitable for use in the present compositions as the oil that is mixed with, but additional to, the oil(s) used to prepare the alkyd resin, so long as the resultant stain composition both penetrates the pores of the substrate surface and is dryable, as described hereinafter.

In certain embodiments, such drying and/or semi-drying oils are present in the stain compositions of the present invention in an amount of 40 up to 90 percent by weight or, in some embodiments, 50 up to 80 percent by weight, or, in yet other embodiments, 60 up to 70 percent by weight, with weight percent being based on the total weight of the composition.

In certain embodiments, the stain compositions of the present invention may also comprise a binder that includes a non-drying oil that is mixed with, but additional to, any non-drying oils used to prepare the alkyd resin. Any of the non-drying oils previously described as being suitable for use in preparing the alkyd resin are also suitable for use in the present compositions as the oil that is mixed with the alkyd resin. When used, such non-drying oils are present in the stain compositions of the present invention in an amount of up to 20 percent by weight or, in some embodiments, up to 10 percent by weight, with weight percent being based on the total weight of the composition.

In certain embodiments, however, the stain compositions of the present invention are substantially free of or, in some cases, completely free of any non-drying oil. Thus, certain embodiments of the present invention comprise no more than 5 percent by weight non-drying oil or, in some cases, no more than 1 percent by weight non-drying oil, or, in yet other cases, no more than 0.1 percent by weight non-drying oil, with weight percent being based on the total weight of the composition.

In certain embodiments, the stain compositions of the present invention also comprise a cure-promoting catalyst to promote the oxidative cure of binder components present in the composition. In certain embodiments, a metal drier is employed for this purpose. Examples of suitable metal driers include, but are not limited to, various salts of cobalt, zirconium, calcium, zinc, and manganese. In some cases, the metal salts of carboxylates having various chain lengths are particularly suitable. Any suitable amount of such metal drier catalyst may be employed, however, in certain embodiments, the catalyst is present an amount ranging from 0.01 percent to 5 percent by weight, such as 0.1 to 1 percent by weight, with weight percents being based on total weight of the stain composition.

In certain embodiments, the stain compositions of the present invention also comprise a colorant. Suitable colorants include, for examples, pigments (organic or inorganic) and dyes. Inorganic pigments include metal oxides, such as the oxides of iron, titanium, zinc, cobalt, and chrome. Earth colors may employ mineral pigments obtained from clay. Various forms of carbon may be used for black coloration. Organic pigments are typically insoluble and are derived from natural or synthetic materials, and include phthalocyanine, lithos, toluidine, and para red. Organic pigments may be employed in a precipitated form as a flake. Dyes encompass a wide variety of organic materials that may be used in stain compositions, e.g., acid dyes. Dyes that are water soluble particularly lend themselves to use in the stain compositions of the present invention.

In certain embodiments, the stain compositions of the present invention comprise 0.1 up to 30 percent by weight of the colorant or, in some embodiments, 1 up to 6 percent by weight of the colorant, based on the total weight of the composition.

In addition, the stain compositions of the present invention may contain other optional ingredients including ultraviolet absorbers, pigments and inhibitors known in the art. In addition, various fillers, plasticizers, flow control agents, surfactants and other known formulating additives may be used. Also useful in the coating compositions of the invention is an aluminum or titanium chelating crosslinker such as ALUSEC 510 ethyl acetoacetato-di-2-ethoxy ethoxy aluminum manufactured by Manchem Ltd. or TYZOR TPT tetraisopropyl titanate manufactured by DuPont Corporation. An antiskin agent, such as methyl ethyl ketoxime, is often added to improve package stability. Fillers, such as talc, clay, silica and the like can be added; suitable silicas are commercially available from W. R. Grace and Company as SYLOID 169 and from Degussa Corporation as AEROSIL 972. Other additives to enhance properties, stability, wetting agents for colorant acceptance. Various additives, when used, typically comprise no more than about 30 weight percent, such as no more than about 10 weight percent, of the present stain compositions.

In certain embodiments, the stain compositions of the present invention may comprise a limited amount of volatile organic material, so long as the composition comprises less than 250 grams of volatile organic material per liter of the stain composition, or, in other embodiments, no more than 100 grams of volatile organic material per liter of the composition or, in some cases, no more than 50 grams of volatile organic material per liter of the composition, or, in other cases, no more than 25 grams of volatile organic material per liter of the composition. Non-limiting examples of suitable volatile organic materials include alcohols, mineral spirits, benzenes, toluenes, ketones, aromatic hydrocarbons, glycol ethers, esters and mixtures thereof. As used herein, the term "volatile organic material" refers to compounds that have at least one carbon atom and which are released from the composition during drying and/or curing thereof.

The stain compositions of the present invention are substantially free or, in some cases, completely free of water. As a result, certain embodiments of the present invention are directed to stain compositions that have long open time and are non grain-raising. Moreover, since water is substantially or completely absent from the stain compositions of the present invention, the compositions do not require the use of a film-forming material that is water dispersible, such as certain acrylate functional resins. As a result, certain embodiments of the present invention are substantially free or, in some cases, completely free of such a material. Certain embodiments of the present invention comprise no more than 1 percent by weight water, or, in some cases, no more than 0.1 percent by weight water, with weight percent being based on the total weight of the composition. As used herein, the term "non grain-raising" means that a composition, when applied to a wood substrate, averts significant lifting of the wood fibers to an extent that a subsequent sanding step is not required in order to obtain a smooth surface. As used herein, the term "long open time" means that a stain composition exhibits a delayed period of time of at least 15 minutes or, in some cases, at least 30 minutes or, in yet other cases, at least 1 hour between application and drying, during which the composition remains workable by rubbing or wiping.

It has been surprisingly discovered that the herein described oil-based stain compositions of the present invention are "dryable" despite comprising no more than 100 grams of volatile organic material per liter of the composition or, in some cases, no more than 50, or, in other cases, no more than 25 grams of volatile organic material per liter of the composition. As used herein, the term "dryable" means that a composition is capable of forming a cured, non-tacky, film, within 24 hours after application to a substrate. In certain embodiments of the present invention, the stain composition dries within 12 hours or, in yet other cases, within 4 hours after application to a substrate. Historically, dryable oil-based alkyd resin containing stain compositions have not been achieved which comprise no more than 100 grams of volatile organic material per liter of the composition.

The stain compositions of the present invention may be prepared by any of a variety of methods. For example, such stains can be prepared by blending the binder components, additives, and any solvents, to form a clear base. The appropriate ratio of pigments or dyes can then be added to the base to achieve the desired color and intensity.

The stain compositions of the present invention are suitable for application to, for example, porous substrates, such as paper, cardboard, particle board, fiber board, wood and wood products; wood substrates are particularly suitable. Various woods can be stained with the present compositions, including, for example, oak and maple. These types of woods are often used in the preparation of, for example, kitchen cabinets, bath cabinets, tables, desks, dressers, and other furniture.

The stain compositions of the present invention can be applied to the substrate by any means known in the art. For example, they can be applied by wiping, brushing, dipping, flow coating, as well as conventional and electrostatic spraying. In many cases, 0.5 to 5.0 wet mils are applied, allowed to soak in for a period of time, and the excess stain wiped off. Multiple layers can be applied. The present stains can then be cured by initiating oxidative cure of the binder components. Such oxidative cure can be accomplished by merely allowing the coated substrate to be exposed to ambient or elevated temperature conditions.

As will be appreciated, additional coating layers, such as a sealer and/or a topcoat, may be applied over the top of the stain layer. According to the present invention, a sealer, topcoat or both can optionally be applied over top of the stain layer. As a result, certain embodiments of the present invention are directed to substrates at least partially coated with a multi-layer composite coating system wherein at least one coating layer is deposited from a stain composition of the present invention. "Sealer" will be understood as referring to the clearcoat applied directly to the stained surface, while a "topcoat" refers to the clearcoat applied directly to the sealer. The sealer and topcoat can be any such coatings known in the art. Sealers and topcoats are often cured by chemical crosslinking of crosslinkable components in the composition. For example, in certain embodiments, the stain compositions of the present invention are utilized in combination with a sealer and/or topcoat that comprises a liquid composition, solventborne or waterborne, that forms a polyurethane coating obtained by the reaction of a hydroxy-functional material with an isocyanate functional material, as understood by those skilled in the art. In certain embodiments, the sealer and/or topcoat are curable by free radical cure. For example, the topcoat can have a polymer comprising an alkyd portion as well as a free radical curable portion. Such formulations are illustrated in United States Published Patent Application 2004-0013895 A1, incorporated by reference herein.

The present invention is further directed to a method for coating a substrate comprising applying any of the stains described above and allowing oxidative cure to take place, which may or may not involve affirmative steps. That is, the oxidative cure can simply occur on its own, without additional action by the user. The method can further comprise applying a sealer, topcoat or both to the stained substrate; in this embodiment, the stain can undergo any level of cure, e.g. no cure, partial cure or complete cure, before application of any additional layer(s).

As should be apparent from the foregoing description, the present invention is also directed to dryable wiping stain compositions comprising a binder comprising a mixture of an alkyd resin and a drying and/or semi-drying oil, wherein the stain composition (i) comprises less than 250 grams of volatile organic material per liter of the stain composition, and (ii) is substantially free of water.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

A stain composition was prepared by adding the components listed in Table 1 in order to a suitable vessel with agitation.

TABLE 1

| Component | Description | Amount (grams) |
| --- | --- | --- |
| Mineral Spirits | solvent | 256 |
| DuraMac 55-5543[1] | binder | 318 |
| Linseed Oil | drying oil | 256 |
| Soya Oil | semi-drying oil | 149 |
| Calcium Drier (6% Ca carboxylates)[2] | drier | 8 |
| Zirconium Drier (18% Zr-ethylhexanoate)[2] | drier | 2 |
| Cobalt Drier (12% Co carboxylates)[2] | drier | 2 |
| Soya Lecithin | wetting agent | 5 |
| Methyl Ethyl Ketoxime | anti-skin agent | 5 |

[1]100 percent solids alkyd resin available from Resolution Specialty Chemicals.
[2]Available from OMG Americas Inc.

The stain composition had a calculated 240 grams of volatile organic material per liter of the composition, calculated according to the equation; VOC=grams VOC/(liters paint-liters water).

Example 2

A stain composition was prepared by adding the components listed in Table 2 in order to a suitable vessel with agitation.

TABLE 2

| Component | Description | Amount (grams) |
| --- | --- | --- |
| DuraMac 55-5543[1] | binder | 334 |
| Linseed Oil | drying oil | 235 |
| Soya Oil | semi-drying oil | 210 |
| quindo-Magenta dispersion | tint | 58 |
| Red oxide dispersion | tint | 40 |
| Carbon black dispersion | tint | 26 |
| Calcium Drier (6% Ca carboxylates)[2] | drier | 34 |
| Zirconium Drier (18% Zr-ethylhexanoate)[2] | drier | 22 |
| Cobalt Drier (12% Co carboxylates)[2] | drier | 6 |
| Soya Lecithin | wetting agent | 31 |
| Methyl Ethyl Ketoxime | anti-skin | 5 |

The stain composition had a calculated 85 grams of volatile organic material per liter of the composition, calculated as described above.

Example 3

A stain composition was prepared by adding the components listed in Table 3 in order to a suitable vessel with agitation.

TABLE 3

| Component | Description | Amount (grams) |
|---|---|---|
| DuraMac 55-5543[1] | binder | 47 |
| Linseed Oil | drying oil | 325 |
| Soya Oil | semi-drying oil | 182 |
| Calcium Drier (6% Ca carboxylates)[2] | drier | 12 |
| Zirconium Drier (18% Zr-ethylhexanoate)[2] | drier | 3 |
| Cobalt Drier (12% Co carboxylates)[2] | drier | 3 |
| Methyl Ethyl Ketoxime | anti-skin | 6 |

The stain composition had a calculated 15 grams of volatile organic material per liter of the composition, calculated as described above.

Example 4

Each of the stain compositions described in examples 1-3 above were applied to maple and oak boards using a foam applicator. After 5 minutes the excess stain was removed from a portion of each of the boards using a cloth. This process was repeated at other portions of the boards except that the excess stain was removed at 10, 15, 30, 45 and 60 minutes after application and the colors of each portion compared to the portion wiped after five minutes. Color did not vary visually from 5 to 60 minutes for the compositions tested. Each sample was able to be wiped after one hour with no observable change in viscosity. Samples on both oak and maple were dry to the touch, i.e., non-tacky, within 12 to 24 hours after application.

Whereas particular embodiments of this invention have been described above for purposes of illustration, it will be evident to those skilled in the art that numerous variations of the details of the present invention may be made without departing from the invention as defined in the appended claims.

I claim:

1. A dryable stain composition comprising a cure-promoting catalyst and a binder comprising a mixture of an alkyd resin and a drying and/or semi-drying oil, wherein the stain composition: (a) comprises less than 100 grams of volatile organic material per liter of the stain composition; and (b) is substantially free of water.

2. The stain composition of claim 1, wherein the composition is a wiping stain composition.

3. The stain composition of claim 1, wherein the alkyd resin is capable of undergoing oxidative cure.

4. The stain composition of claim 1, wherein the alkyd resin is pourable at one hundred percent solids.

5. The stain composition of claim 1, wherein the drying and/or semi-drying oil comprises soya oil and/or linseed oil.

6. The stain composition of claim 1, wherein the alkyd resin is present in an amount of 10 up to 60 percent by weight and the drying and/or semi-drying oil is present in an amount of 40 up to 90 percent by weight, with the percents by weight being based on the total weight of the stain composition.

7. The stain composition of claim 1, wherein the stain composition is substantially free of any non-drying oil.

8. The stain composition of claim 1, further comprising a colorant.

9. The stain composition of claim 1, wherein the stain composition comprises no more than 50 grams of volatile organic material per liter of the stain composition.

10. The stain composition of claim 9, wherein the stain composition comprises no more than 25 grams of volatile organic material per liter of the stain composition.

11. The stain composition of claim 1, wherein the stain composition has an open time of at least 15 minutes.

12. The stain composition of claim 1, wherein the stain composition dries within 24 hours after application to a substrate.

13. The stain composition of claim 1, wherein the stain composition dries within 12 hours after application to a substrate.

14. A method for at least partially coating a porous substrate comprising applying the stain composition of claim 1 to at least a portion of the substrate and allowing the stain composition to oxidatively cure.

15. A dryable wiping stain composition comprising a cure-promoting catalyst and a binder comprising a mixture of an alkyd resin, a drying and/or semi-drying oil, and up to 20 percent by weight of a non-drying oil based on the total weight of the stain composition, wherein the stain composition: (a) comprises less than 250 grams of volatile organic material per liter of the stain composition; and (b) is substantially free of water and (meth)acrylates.

16. The stain composition of claim 15, wherein the alkyd resin is pourable at one hundred percent solids.

17. The stain composition of claim 15, wherein the alkyd resin is present in an amount of 10 up to 60 percent by weight and the drying and/or semi-drying oil is present in an amount of 40 up to 90 percent by weight, with the percents by weight being based on the total weight of the stain composition.

18. The stain composition of claim 15, wherein the stain composition is substantially free of any non-drying oil.

19. The stain composition of claim 15, wherein the stain composition comprises no more than 100 grams of volatile organic material per liter of the stain composition.

* * * * *